US012768440B2

(12) United States Patent
Blessing et al.

(10) Patent No.: US 12,768,440 B2
(45) Date of Patent: Oct. 20, 2026

(54) ELECTRIC DRIVE DEVICE FOR A MOTOR VEHICLE, IN PARTICULAR FOR A MOTOR CAR

(71) Applicant: Mercedes-Benz Group AG, Stuttgart (DE)

(72) Inventors: Martin Blessing, Neckartenzlingen (DE); Rainer Pauls, Vaihingen (DE); Markus Herkommer, Vaihingen (DE); Frank Hoffmann, Stuttgart (DE); Alexander Buy, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 19/154,956

(22) PCT Filed: Jan. 25, 2024

(86) PCT No.: PCT/EP2024/051820
§ 371 (c)(1),
(2) Date: Aug. 8, 2025

(87) PCT Pub. No.: WO2024/165331
PCT Pub. Date: Aug. 12, 2024

(65) Prior Publication Data

US 2026/0235199 A1 Aug. 13, 2026

(30) Foreign Application Priority Data

Feb. 10, 2023 (DE) ..................... 10 2023 000 431.6

(51) Int. Cl.
*F16H 57/04* (2010.01)
*B60K 11/02* (2006.01)

(52) U.S. Cl.
CPC .......... *F16H 57/0404* (2013.01); *B60K 11/02* (2013.01); *F16H 57/0415* (2013.01);
(Continued)

(58) Field of Classification Search
CPC ............. F16H 57/0476; F16H 57/0452; F16H 57/0436; F16H 57/0404; B60K 11/02
See application file for complete search history.

(56) References Cited

U.S. PATENT DOCUMENTS 5,217,085 A 6/1993 Barrie et al.
7,637,336 B2 * 12/2009 Enomoto ............ F16H 61/0009 180/69.1

(Continued)

FOREIGN PATENT DOCUMENTS

DE 34 14 608 A1 4/1985
DE 10 2012 201 060 A1 7/2013

(Continued)

OTHER PUBLICATIONS

International Search Report (PCT/ISA/210) issued in PCT Application No. PCT/EP2024/051820 dated Apr. 15, 2024 with English translation (5 pages).

(Continued)

*Primary Examiner* — Michael A Riegelman
(74) *Attorney, Agent, or Firm* — Crowell & Moring LLP

(57) ABSTRACT

An electric drive device has an electric engine which has one rotor and one stator, gear components via which the motor vehicle can be driven by the electric engine, and a cooling and lubricating device which has a lubricant and coolant circuit through which lubricant and coolant can flow and in which the gear components, the electric engine, a sump for receiving the lubricant and coolant, a cooling device for cooling the lubricant and coolant, and a pump device are arranged, via which pump device the lubricant and coolant can be conveyed from the sump at least to the gear components. The lubricant and coolant circuit has a first branch through which the lubricant and coolant can flow from the
(Continued)

sump and via which the lubricant and coolant flowing through the first branch can be supplied to the stator.

8 Claims, 4 Drawing Sheets

(52) U.S. Cl.
CPC ..... *F16H 57/0436* (2013.01); *F16H 57/0452* (2013.01); *F16H 57/0476* (2013.01)

(56) References Cited

U.S. PATENT DOCUMENTS

| | | | | |
|---|---|---|---|---|
| 8,909,402 | B2 * | 12/2014 | Miyamoto | H02K 9/193 903/902 |
| 9,242,637 | B2 * | 1/2016 | Miyamoto | B60W 20/00 |
| 11,231,103 | B2 * | 1/2022 | Staake | F16H 57/0441 |
| 11,370,293 | B2 * | 6/2022 | Merz | F16H 57/0436 |
| 12,098,766 | B2 * | 9/2024 | Greiter | F16H 57/0415 |
| 12,473,970 | B2 * | 11/2025 | Gassmann | F16H 57/0435 |
| 12,618,463 | B2 * | 5/2026 | Greiter | F16H 57/0476 |
| 2006/0231339 | A1 * | 10/2006 | Enomoto | B60K 6/365 184/6.9 |
| 2013/0192400 | A1 * | 8/2013 | Dodo | F16H 37/082 74/421 A |
| 2014/0234124 | A1 * | 8/2014 | Ruhle | F16H 57/0473 417/364 |
| 2014/0331639 | A1 * | 11/2014 | Raimarckers | F01D 25/20 184/26 |
| 2015/0051768 | A1 * | 2/2015 | Miyamoto | F01P 7/14 903/904 |
| 2019/0120369 | A1 * | 4/2019 | Staake | F16H 57/045 |
| 2019/0285161 | A1 | 9/2019 | Rosendahl et al. | |
| 2019/0305643 | A1 | 10/2019 | Huber et al. | |
| 2021/0006132 | A1 * | 1/2021 | Steinz | F16H 57/0417 |
| 2023/0076394 | A1 * | 3/2023 | Yeomans | B60H 1/00278 |
| 2023/0387752 | A1 * | 11/2023 | Kuebler | B60K 1/00 |
| 2024/0271693 | A1 * | 8/2024 | Gassmann | H02K 7/116 |
| 2024/0339895 | A1 * | 10/2024 | Krank | F16N 7/40 |

FOREIGN PATENT DOCUMENTS

| | | | | | |
|---|---|---|---|---|---|
| DE | 10 2016 211 226 | B3 | | 6/2017 | |
| DE | 10 2016 121 863 | A1 | | 5/2018 | |
| DE | 10 2017 201 117 | A1 | | 7/2018 | |
| DE | 10 2020 004 448 | A1 | | 1/2022 | |
| DE | 102021110135 | B3 | * | 8/2022 | H02K 9/19 |
| DE | 102023005204 | A1 | * | 6/2025 | B60K 11/02 |
| WO | WO 2023/006219 | A1 | | 2/2023 | |

OTHER PUBLICATIONS

German-language Written Opinion (PCT/ISA/237) issued in PCT Application No. PCT/EP2024/051820 dated Apr. 15, 2024 with English translation (10 pages).

German-language Office Action issued in German Application No. 10 2023 000 431.6 dated Oct. 4, 2023 (10 pages).

* cited by examiner

ELECTRIC DRIVE DEVICE FOR A MOTOR VEHICLE, IN PARTICULAR FOR A MOTOR CAR

BACKGROUND AND SUMMARY OF THE INVENTION

The invention relates to an electric drive device for a motor vehicle, in particular for a motor car.

A drive device for a motor vehicle is taken as known from DE 10 2020 004 448 A1, having at least one electric engine, having a gearbox via which the motor vehicle can be driven by means of the electric engine, and having a lubricant and coolant circuit in which the gearbox, the electric engine, a sump for receiving a lubricant and coolant and a pump device are arranged, by means of which pump device the lubricant and coolant is conveyed from the sump to the electric engine and to the gearbox.

Furthermore, DE 34 14 608 A1 discloses a lubricating oil filter for an internal combustion engine, having a filter housing divided into two chambers for receiving one lubricating oil filter each. Furthermore, a lubricating oil filter for an internal combustion engine is known from DE 34 14 608 A1.

The object of the present invention is to create an electric drive device for a motor vehicle, in particular for a motor car, so that particularly advantageous lubrication and cooling can be achieved.

The invention relates to an electric drive device for a motor vehicle, also simply referred to as a vehicle. This means that, in its completely produced state, the motor vehicle, preferably formed as a motor car, in particular as a passenger car, has the electric drive device and can be driven electrically, in particular purely electrically, by means of the electric drive device. For example, in its completely produced state, the motor vehicle has at least or exactly two vehicle axles, which are also simply referred to as axles, arranged successively in the vehicle longitudinal direction of the motor vehicle and thus one behind the other. The respective vehicle axle has at least or exactly two vehicle wheels, also simply referred to as wheels, for example. For example, the vehicle wheels of the respective vehicle axle are arranged on opposite sides of the motor vehicle in the vehicle transverse direction of the motor vehicle. The vehicle wheels of the motor vehicle are ground contact elements, by means of which the motor vehicle is or can be supported downwards on ground, in the vehicle vertical direction of the motor vehicle. If the motor vehicle drives along the ground while the motor vehicle is supported in the vehicle vertical direction of the motor vehicle downwards on the ground by the ground contact elements, the ground contact elements roll, in particular directly, on the ground. In this case, the vehicle wheels of at least or exactly one of the vehicle axles can be driven electrically, in particular purely electrically, by means of the electric drive device, whereby the motor vehicle can be driven electrically, in particular purely electrically. The vehicle wheels, which can be driven electrically, in particular purely electrically, by means of the electric drive device are also referred to as drivable wheels, driven wheels or drive wheels.

For example, the electric drive device has at least one electric engine, by means of which the drive wheels can be driven electrically, in particular purely electrically. Therefore, the electric engine comprises at least one rotor and a stator. For example, the rotor can be driven by means of the stator and thus can be rotated around an engine rotational axis relative to the stator. In particular, the electric engine can provide drive torques via its rotor, by means of which the drive wheels can be driven electrically, in particular purely electrically. For example, the electric engine is designed as an axial flux machine (AFM). Alternatively, the electric engine can be designed as a radial flux machine (RFM).

The electric drive device furthermore comprises gear components, via which the motor vehicle, in particular the drive wheels, can be or are driven by means of the electric engine, in particular by means of the rotor. For example, the gear components are components of a gearbox of the drive device, wherein the motor vehicle, in particular the drive wheels, can be or are driven via the gearbox by means of the electric engine, in particular by means of the rotor.

The electric drive device also has a cooling and lubricating device, which is also referred to as a cooling device or as a lubricating device. As will be explained more precisely in the following, at least one partial region of the electric drive device can be cooled and lubricated by means of the cooling and lubricating device. The cooling and lubricating device has a lubricant and coolant circuit through which lubricant and coolant can flow and which is also referred to as a lubricant and coolant circuit or simply as a circuit. The lubricant and coolant is also simply referred to as a lubricant or as a coolant and is a fluid, so the coolant and lubricant is also referred to as a fluid. More particularly, the lubricant and coolant is a liquid. More preferably, the lubricant and coolant is an oil, which is also referred to as a lubricating oil, cooling oil or cooling and lubricating oil. In the lubricant and coolant circuit, the gear components, the electric engine, a sump for at least temporarily receiving the lubricant and coolant, a cooling device for cooling the lubricant and coolant and at least one pump device are arranged, by means of which pump device the lubricant and coolant can be conveyed, i.e., is to be conveyed, from the sump at least to the gear components. The lubricant and coolant can thus be received in the sump, in particular to form a level of the lubricant and coolant, also colloquially referred to as a gauge. In particular, the level of the coolant and lubricant in the sump is understood to mean a height of the coolant and lubricant received in the sump and thus an uppermost surface of the lubricant and coolant received in the sump in the vehicle vertical direction of the motor vehicle in the mounting position of the electric drive device, wherein the electric drive device occupies its mounting position in the completely produced state of the motor vehicle, also simply referred to as a vehicle, having the electric drive device.

The lubricant and coolant circuit has a first branch, through which the lubricant and coolant conveyed by means of the pump device can flow from the sump, thus through which a first partial flow of the lubricant and coolant conveyed by means of the pump device can flow. The lubricant and coolant flowing through the first branch, i.e., the first partial flow flowing through the first branch, can be supplied to the stator by means of the first branch, i.e., can be guided to the stator, whereby the stator can be supplied with the lubricant and coolant, i.e., with the first partial flow. This means that the stator can be cooled and/or lubricated by means of the lubricant and coolant, i.e., by means of the first partial flow.

The lubricant and coolant circuit also has a second branch, for example fluidically separated at least partially from the first branch and through which the lubricant and coolant conveyed by means of the pump device can flow from the sump, thus through which second branch a second partial flow of the lubricant and coolant conveyed by means of the pump device can flow. The lubricant and coolant flowing through the second branch, i.e., the second partial flow flowing through the second branch, can be supplied to the gear components by means of the second branch, i.e., can be guided to the gear components, whereby the gear components can be supplied with the coolant and lubricant, i.e., with the second partial flow. This means that the gear components can be cooled and/or lubricated by means of the lubricant and coolant.

In order to be able to realize particularly advantageous lubricating and cooling of the electric drive device, it is provided according to the invention that the first branch is executed or designed, with the exception of at least or exactly one ventilation point provided or designed for ventilating the first branch, as a closed circuit, which has a recirculation running closed—with the exception of the at least or exactly one ventilation point—from the stator to an intake region and by means of which the lubricant and coolant can be guided into the intake region, from which the lubricant and coolant can be sucked in by means of the pump device. In other words, the pump device can suck in the lubricant and coolant from the intake region during operation of the pump device, i.e., convey it towards itself and, in particular then, convey it away from itself and therefore through the branches. By means of the recirculation running in particular closed—with the exception of the ventilation point or points—from the stator to the intake region and through which the lubricant and coolant flowing away from or off the stator can flow, the lubricant and coolant flowing away from or off the stator can be guided specifically and in a defined manner to and into the intake region. As the recirculation leads closed—with the exception of the at least or exactly one ventilation point—from the stator to the intake region, excessive foaming of the lubricant and coolant, which flows through the recirculation and therefore is guided from the stator (back) into the intake region, can be avoided. This means that it is possible to keep the amount of the lubricant and coolant in the electric drive device advantageously low, so that the weight of the electric drive device, which here preferably comprises the lubricant and coolant, so that preferably the lubricant and coolant is a component of the electric drive device, can be kept particularly low. Furthermore, a particularly efficient operation of the electric drive device can be ensured thereby. Furthermore, excessive heat dissipation from the lubricant and coolant flowing from the stator into the intake region and thus the recirculation can be avoided, as the lubricant and coolant can be guided specifically and in a defined manner with the recirculation to and into the intake region over the shortest possible route. Furthermore, excessive large-scale contact of the lubricant and coolant, for example with a housing inner wall of a housing of the electric drive device, in which housing, for example, the stator and the recirculation are arranged, can be avoided, so that excessive heat removal or excessive heat dissipation from the lubricant and coolant can be avoided. In other words, it can be avoided hereby that an excessive amount of heat is lost unused by the lubricant and coolant, so that the invention is also able to make targeted use of an amount of heat absorbed received by the lubricant and coolant and thus contained in the lubricant and coolant.

In order to be able to realize particularly advantageous cooling and lubricating of the drive device, is it provided in one embodiment of the invention that a filter element for filtering the lubricant and coolant flowing through the second branch is provided, i.e., arranged, in particular exclusively in relation to the first branch and the second branch, i.e., only in the second branch. The lubricant and coolant flowing through the second branch can flow through the filter element, and any particles contained in the lubricant and coolant flowing through the second branch, in particular depending on the size of the particles, can be filtered out from the lubricant and coolant. Therefore, for example, the filter element has pores through which the lubricant and coolant can flow. If any particles contained in the lubricant and coolant are larger than the pores, the particles remain attached to the filter element when the lubricant and coolant flows through the filter element, whereby the particles can be filtered out from the lubricant and coolant by means of the filter element. For example, the filter element is designed as a nonwoven, i.e., as a filter nonwoven. The particles are or result, for example, from abrasion, which can occur during operation of the electric drive device and thus the gear components. In this case, efficient and effective filtering of the lubricant and coolant can be realized, so that the drive device can be effectively and efficiently cooled and lubricated.

A further embodiment of the electric drive device is characterized by a filter device, which is arranged in the sump, in particular below the level, and is designed as a multi-chamber filter. The filter device has a gear lubricant filter element, arranged in particular in the second branch, for filtering the lubricant and coolant flowing through the second branch. For example, the gear lubricant filter element is the aforementioned filter element. The lubricant and coolant flowing through the second branch can flow through the gear lubricant filter element which can filter out any particles contained in the lubricant and coolant flowing through the second branch from the lubricant and coolant, as explained in relation to the filter element. The preceding and following embodiments relating to the filter element can also be transferred to the gear lubricant filter element and vice versa.

The filter device, i.e., the multi-chamber filter, also has a stator lubricant filter element, arranged in the first branch, for filtering the lubricant and coolant flowing through the first branch. The stator lubricant filter element is also referred to as a first filter element, and the gear lubricant filter element is also referred to as a second filter element. In particular, any particles contained in the lubricant and coolant flowing through the first branch can be filtered out from the lubricant and coolant flowing through the first branch by means of the first filter element (stator lubricant filter element). When the respective filter element is referred to in the following, unless otherwise stated, this means collectively the first filter element and the second filter element. For example, the lubricant and coolant can flow through the respective filter element, so that, for example, the coolant and lubricant flowing through the first branch can flow through the first filter element and so that, for example, the lubricant and coolant flowing through the second branch can flow through the second filter element. Any particles contained in the lubricant and coolant can be filtered out from the lubricant and coolant by means of the respective filter element, so that, for example, any particles contained in the lubricant and coolant flowing through the first branch can be filtered out from the lubricant and coolant flowing through the first branch by means of the first filter element and so that, for example, any particles contained in the lubricant and coolant flowing through the second branch can be filtered out from the lubricant and coolant flowing through the second branch by means of the second filter element. In this case, for example, the respective filter element has pores through which the lubricant and coolant can flow. If the particles possibly contained in the lubricant and coolant are larger than the pores, the particles remain attached to the respective filter element, whereby the particles can be filtered out from the lubricant and coolant. The particles contained in the lubricant and coolant result, for example, from abrasion, which, for example, arises due to operation of the drive device. For example, the respective filter element is designed as a respective nonwoven, i.e., as a respective filter nonwoven. The lubricant and coolant can be effectively and efficiently filtered by means of the first filter element and by means of the second filter element, and therefore purified, whereby particularly advantageous, effective and efficient cooling and lubricating of the electric drive device can be realized.

Preferably, the filter device is arranged in particular completely below the level of the lubricant and coolant.

A further embodiment is characterized in that the multi-chamber filter has a filter housing, which, in particular directly, delimits a receiving chamber for the at least temporary receiving of the lubricant and coolant. In particular, the receiving chamber is, in particular directly, delimited by an inner circumferential lateral surface of the filter housing. The multi-chamber filter has the stator lubricant filter element (first filter element) arranged in the filter housing, wherein the receiving chamber is divided into a first chamber of the multi-chamber filter and into a second chamber of the multi-chamber filter by the stator lubricant filter element and therefore is arranged between the first chamber and the second chamber. The second chamber is designed as an intake chamber forming the intake region. In particular, the stator lubricant filter element is arranged in the receiving chamber. Furthermore, the multi-chamber filter has the gear lubricant filter element (second filter element) arranged in the filter housing, in particular in the receiving chamber, wherein the receiving chamber is divided into the second chamber and into a third chamber of the multi-chamber filter by the gear lubricant filter element, whereby the gear lubricant filter element is arranged between the second chamber and the third chamber.

The multi-chamber filter, in particular the filter housing, has a connection, also referred to as a connection element or connection piece. The recirculation has a recirculation line which runs, in particular completely, closed from the stator to the connection and which is fluidically connected to the first chamber by means of the connection. In particular, the recirculation line is also mechanically connected to the multi-chamber filter, in particular to the filter housing, by means of the connection. Thus, the coolant and lubricant flowing through the first branch, i.e., the first partial flow, can flow through the recirculation line and the connection, so that the lubricant and coolant flowing through the recirculation line can flow out from the recirculation line and therefore then flow through the connection and flow out from the connection and therefore then flow into the first chamber. Thus, the lubricant and coolant can be supplied from the recirculation line via the connection to the first chamber or can be introduced into the first chamber. The lubricant and coolant that has flowed out from the recirculation line and from the connection and into the first chamber can, for example, then flow through the first filter element and therefore flow from the first chamber into the second chamber, i.e., into the intake region, and then be sucked in by means of the pump device, i.e., be conveyed from the intake region towards the pump device. On its way from the first chamber into the second chamber, the lubricant and coolant flow through the first filter element and thus is filtered by means of the first filter element.

Furthermore, the multi-chamber filter, in particular the filter housing, has an insertion opening of the third chamber, designed in particular as a through opening, wherein, for example, the insertion opening in particular completely penetrates the filter housing. Thus, for example, the insertion opening opens into the third chamber at one end, in particular directly, and at the other end, in particular directly, into the surroundings of the filter housing per se, i.e., considered in isolation. The lubricant and coolant can be guided out from the sump into the third chamber via the insertion opening, so that, for example, the sump is arranged in the surroundings of the filter housing per se. Thus, for example, the insertion opening opens, in particular directly, into the third chamber at one end and at the other end, in particular directly, into the sump. Thus, the lubricant and coolant can flow through the insertion opening from the sump and thus flow into the third chamber via the insertion opening. The lubricant and coolant can flow through the second filter element from the third chamber and then flow into the second chamber, i.e., the intake region, and can be sucked in from the intake region by means of the pump device and thus be conveyed towards the pump device. On its way from the third chamber into the second chamber, the lubricant and coolant flows through the second filter element and thus is filtered by means of the second filter element. In particular, the recirculation runs completely closed—with the exception of the at least or exactly one ventilation point—from the stator up to the intake region. In particular, it is preferably provided that the recirculation line runs, in particular completely, closed from the stator up to the connection and thus up to the filter housing and into the first chamber.

For example, the recirculation line runs, in particular completely, closed from the stator up to the connection and thus up to the filter housing. As the recirculation line runs for example, in particular completely, closed from the stator up to the connection and thus up to the filter housing, and as the recirculation line is fluidically connected to the connection so that the lubricant and coolant flowing through the recirculation line can flow out from the recirculation line and flow into the first chamber via the connection, the lubricant and coolant can be introduced from the stator bypassing the sump into the first chamber by means of the recirculation line and in particular bypassing the sump, can flow from the first chamber into the second chamber and thus in particular bypassing the sump, can be sucked in from the second chamber by means of the pump device. This means that the lubricant and coolant flow from the stator via the recirculation line, the first chamber and the second chamber to the pump device, without flowing through the sump in the process, i.e., on its way from the stator, via the recirculation line, the first chamber and the second chamber to the pump device. This means that excessive foaming of the lubricant and coolant can be particularly advantageously avoided.

In order to be able to realize particularly advantageous guiding of the lubricant and coolant and subsequently particularly advantageous cooling and lubricating of the drive device, it is provided in a further embodiment of the invention that the second chamber is arranged between the first chamber and the third chamber.

It has also proven particularly advantageous when, in the mounting position of the electric drive device, the first chamber is arranged above the second chamber in the vehicle vertical direction, in particular in such a way that the second chamber is at least partially, in particular at least predominantly or completely, overlapped by the first chamber in the mounting position of the drive device in the vehicle vertical direction. It has also proven particularly advantageous when the second chamber, in the mounting position of the electric drive device, is arranged above the third chamber in the vehicle vertical direction, in particular in such a way that the third chamber is at least partially, in particular at least predominantly and thus at least more than half or even completely, overlapped towards the top by the second chamber in the mounting position of the electric drive device in the vehicle vertical direction. As a result, particularly advantageous guiding of the lubricant and coolant can be realized so that excessive foaming of the lubricant and coolant can be advantageously avoided.

In a further, particularly advantageous embodiment of the invention, it is provided that the first chamber has the ventilation point for ventilating the first branch. Therefore, the first branch can be effectively and efficiently ventilated, without causing excessive foaming of the lubricant and coolant. Ventilating the lubricant and coolant or the first branch is understood to mean that any air contained in the lubricant and coolant or in the first branch, i.e., in the lubricant and coolant circuit, can be discharged from the lubricant and coolant or from the first branch, i.e., from the lubricant and coolant circuit, and in particular can be discharged to the surroundings of the lubricant and coolant circuit. As a result, effective and efficient cooling and lubricating of the electric drive device can be ensured.

In order to be able to advantageously ventilate the lubricant and coolant or the lubricant and coolant circuit, and thus be able to ensure particularly advantageous, effective and efficient cooling and lubricating of the electric drive device, it is provided in a further embodiment of the invention that the ventilation point has, in particular exactly, one vent opening of the filter housing. For example, the vent opening penetrates the filter housing, in particular in such a way that the vent opening opens, in particular directly, into the receiving chamber, in particular into the first chamber, at one end and at the other end opens, in particular directly, to the aforementioned surroundings of the filter housing.

In order to be able to realize particularly effective and efficient cooling and lubricating of the drive device, it is provided in a further embodiment of the invention that the connection is executed to be overlapping the first chamber. In particular, this is understood to mean that the connection piece penetrates into the first chamber, wherein, for example, the connection penetrates at least substantially 5 to 10 mm into the first chamber. As a result, the lubricant and coolant can be particularly advantageously introduced into the first chamber via the connection, without causing excessive foaming of the lubricant and coolant.

In order to be able to realize particularly effective and efficient cooling and lubricating of the drive device, it is provided in a further embodiment of the invention that the stator lubricant filter element is less finely structured in comparison to the gear lubricant filter element. In particular, this is understood to mean, for example, that the pores of the stator lubricant filter element are larger than the pores of the gear lubricant filter element. Alternatively or additionally, the stator lubricant filter element has a smaller layer thickness in comparison to the gear lubricant filter element.

In a further particularly advantageous embodiment of the invention, it is provided that the insertion opening of the third chamber is arranged in the mounting position of the electric drive device in the vehicle vertical direction and thus geodetically below the level of the lubricant and coolant. As a result, the lubricant and coolant can be particularly advantageously guided from the sump, and in particular without causing excessive foaming of the lubricant and coolant, into the third chamber and from the third chamber via the second filter element into the intake region (second chamber).

A further particularly advantageous embodiment of the invention is characterized in that the recirculation line has an inlet opening through which the lubricant and coolant can flow, in particular from the stator and which is at least indirectly fluidically connected to a stator outlet opening, in particular of the stator, through which lubricant and coolant, in particular flowing off the stator, can flow. Thus, the lubricant and coolant flowing off or away from the stator can flow through the stator outlet opening, after lubricating and/or cooling the stator, and thus can flow via the stator outlet opening to the inlet opening, flow through the inlet opening and thus can flow into the recirculation line via the inlet opening. Furthermore, the recirculation line has an outlet opening through which the lubricant and coolant flowing through the recirculation line can flow. In particular, for example, the recirculation line is fluidically connected to the connection via its outlet opening and thus to the first chamber via the connection, so that, for example, the lubricant and coolant flowing through the recirculation line can flow through the outlet opening of the recirculation line and thus can flow out from the recirculation line via the outlet opening, flow through the connection and thus can flow into the first chamber.

In this case, in particular it is provided that the outlet opening of the recirculation line is arranged in the mounting position of the electric drive device in the vehicle vertical direction and thus geodetically below the level of the lubricant and coolant.

In one embodiment of the invention, it is provided that the ventilation point is arranged in the mounting position of the electric drive device in the vehicle vertical direction and thus geodetically below the level of the lubricant and coolant. As a result, the lubricant and coolant circuit can be advantageously ventilated, in particular without causing excessive foaming of the lubricant and coolant.

Preferably, the ventilation point, in particular the vent opening, is arranged at an elevated position or in an elevated region of the filter housing. In particular, it is conceivable that the ventilation point, in particular the vent opening, is arranged in the mounting position of the electric drive device in the vehicle vertical direction and thus geodetically above the first chamber, the second chamber and the third chamber.

The fact that the connection is executed to be preferably overlapping the first chamber, i.e., penetrates into the first chamber, means that the air extracted from the first branch can collect undisturbed in the first chamber and therefore, in particular in the mounting position of the drive device in the vehicle vertical direction, above an opening point at which the connection per se opens into the first chamber. The air is brought into the lubricant and coolant circuit and/or into or via the second branch as a result of leaks, for example.

In a further embodiment of the invention, the insertion opening of the third chamber is arranged below the level of the lubricant and coolant in the sump, in the mounting position of the electric drive device in the vehicle vertical direction.

The fact, for example, that the stator lubricant filter element is less finely structured in comparison to the gear lubricant filter element, and/or has a smaller layer thickness, means that excessive pressure losses can be avoided, so that efficient cooling and lubricating of the drive device can be realized. In particular, this embodiment is possible because no excessive amount of abrasion, to be filtered out from the lubricant and coolant, is introduced into the recirculation, which is closed with the exception of the ventilation point.

Also disclosed is a motor vehicle, also simply referred to as a vehicle, which must be provided can be designed as a motor car, in particular a passenger car and has an electric drive device according to the invention and can be driven electrically, in particular purely electrically, by means of the electric drive device. Advantages and advantageous embodiments of the electric drive device are considered as advantages and advantageous embodiments of the motor vehicle and vice versa.

Further advantages, features and details of the invention can be seen from the following description of a preferred exemplary embodiment and with reference to the drawings. The features and combinations of features mentioned above in the description as well as the features and combinations of features mentioned below in the description of the figures and/or shown alone in the figures can be used not only in the combination indicated in each case, but also in other combinations or on their own, without leaving the scope of the invention.

DETAILED DESCRIPTION OF THE DRAWINGS

Figure 1:
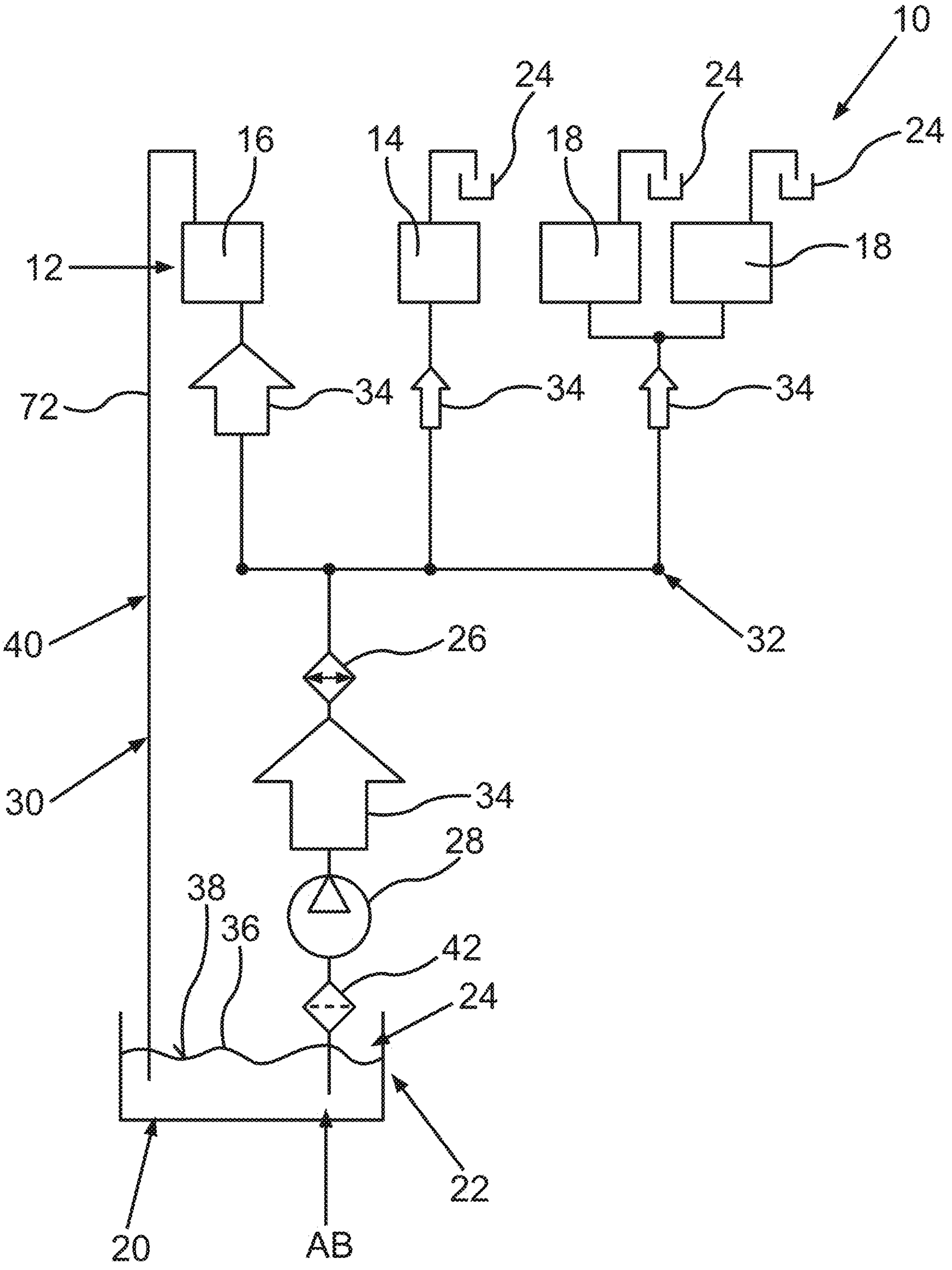
FIG. 1 is a schematic illustration of an electric drive device for a motor vehicle.

In the figures, identical or functionally identical elements are provided with the same reference numerals.

In a schematic illustration, FIG. 1 shows an electric drive device 10 for a motor vehicle, also simply referred to as a vehicle. The electric drive device 10 has at least one electric engine 12, by means of which, for example, at least or exactly two vehicle wheels of the motor vehicle can be driven electrically, in particular purely electrically. For this purpose, the electric engine 12 has at least one rotor 14 and a stator 16. For example, the rotor 14 can be driven by means of the stator 16 and thus can be rotated around an engine rotational axis relative to the stator 16. Furthermore, the electric drive device 10 has gear components 18, via which the motor vehicle can be driven by means of the electric engine 12, in particular by means of the rotor 14. The electric drive device 10 further comprises a cooling and lubricating device 20, which has a lubricant and coolant circuit 22 through which a preferably liquid lubricant and coolant 36 can flow. The lubricant and coolant circuit 22 is also referred to as a circuit. In the lubricant and coolant circuit 22, the gear components 18, the electric engine 12, a sump 24 for at least temporarily receiving the lubricant and coolant 36, a cooling device 26 for cooling the lubricant and coolant 36 and at least one pump device 28 are arranged, by means of which pump device the lubricant and coolant 36 can be conveyed from the sump 24 at least to the gear components 18. It can be seen from FIG. 1 that in the exemplary embodiment shown in the figures, both the rotor 14 as well as the stator 16 are arranged in the lubricant and coolant circuit 22 and thus can be supplied with lubricant and coolant 36 conveyed by means of the pump device 28. The pump device 28 is also simply referred to as a pump.

The lubricant and coolant circuit 22 has a first branch 30 through which the lubricant and coolant 36 conveyed by means of the pump device 28 can flow from the sump 24 and by means of which the lubricant and coolant 36 flowing through the first branch 30 can be supplied to the stator 16. Furthermore, the lubricant and coolant circuit 22 has a second branch 32 through which the lubricant and coolant 36 conveyed by means of the pump device 28 can flow from the sump 24 and by means of which the lubricant and coolant 36 flowing through the second branch 32 can be supplied to the gear components 18. In the exemplary embodiment shown in the figures, it is provided that the lubricant and coolant 36 flowing through the second branch 32 can also be supplied to the rotor 14 by means of the second branch 32. In FIG. 1, arrows 34 illustrate a respective flow of the lubricant and coolant 36 through the lubricant and coolant circuit 22. The lubricant and coolant 36 received in the sump 22 is labelled with 36 in FIG. 1, wherein the lubricant and coolant 36 is or can be received in the sump 24 to form a level 38. The level 38 is also colloquially referred to as a gauge.

Figure 3:
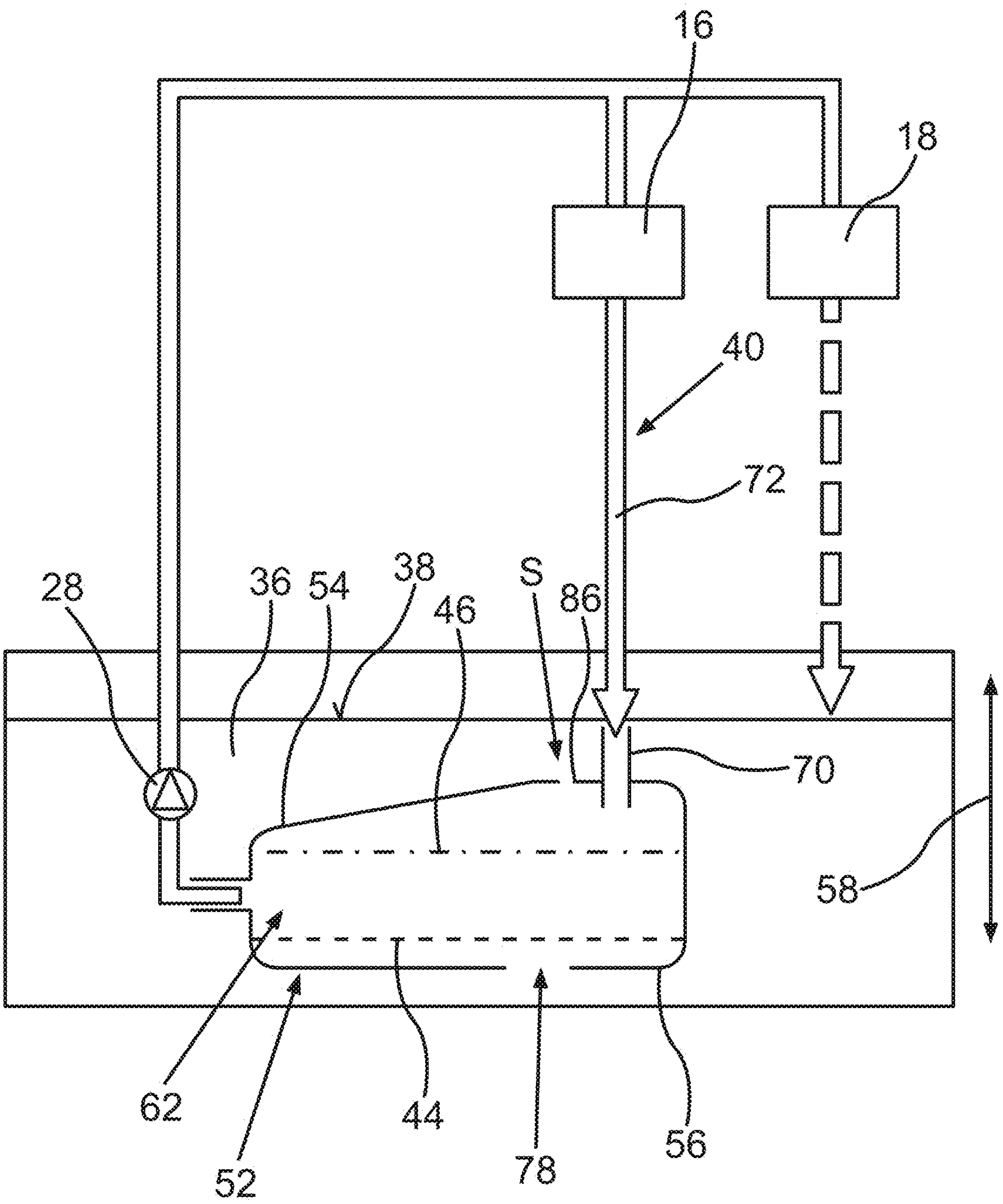
FIG. 3 is a further schematic illustration of the drive device.
Figure 4:
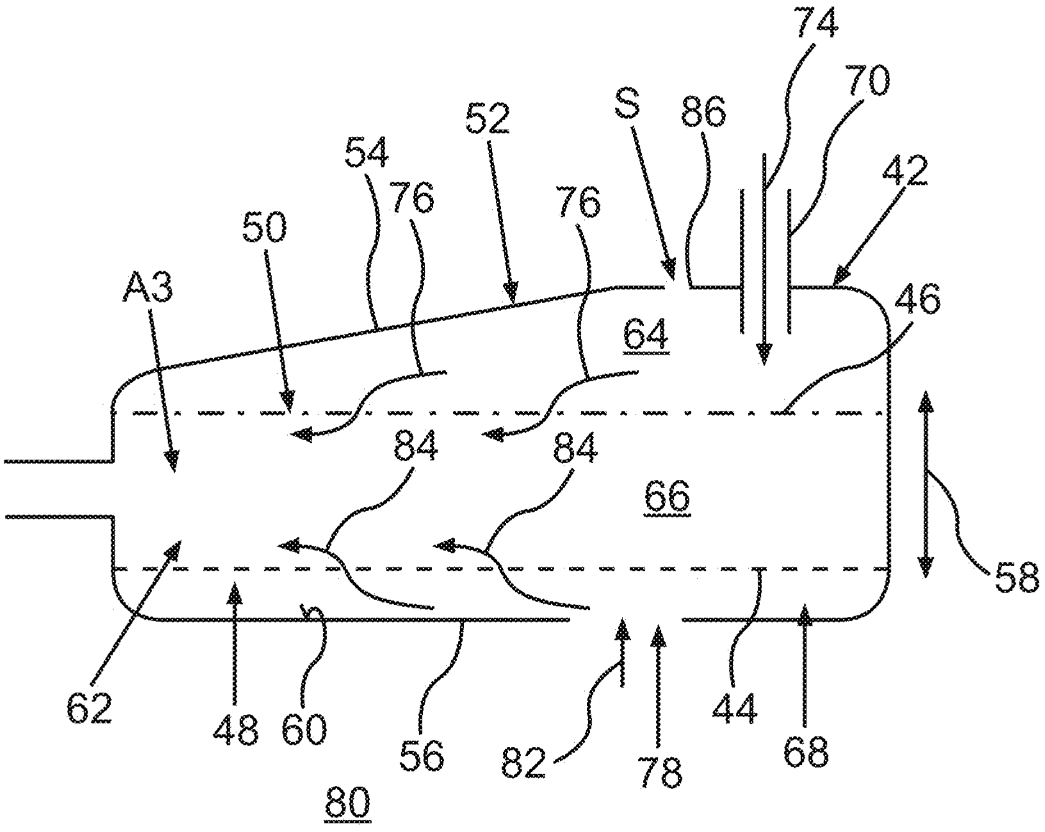
FIG. 4 is a schematic and sectioned side view of a multi-chamber filter of the electric drive device.

In order to be able to realize a particularly advantageous cooling and lubricating of the electric drive device 10, the first branch 30 is designed as a circuit which is closed, with the exception of exactly one ventilation point S that can be seen in FIGS. 3 and 4 for ventilating the lubricant and coolant circuit 22, and which has a recirculation 40 which runs completely closed, with the exception of the presently exactly one ventilation point S, from the stator 16 to an intake region AB, by means of which recirculation the lubricant and coolant 36 can be guided into the intake region AB, from which the lubricant and coolant 36 can be sucked in by means of the pump device 28.

The electric drive device 10, in particular the cooling and lubricating device 20, has a filter device 42, represented particularly schematically in FIG. 1, which as can be seen from FIG. 3, is arranged in the sump 24 and is designed as a multi-chamber filter. It can be seen from FIGS. 3 and 4 that the filter device 42, i.e., the multi-chamber filter, has a gear lubricant filter element 44, arranged in the second branch 32, for filtering the lubricant and coolant 36 flowing through the second branch 32 and a stator lubricant filter element 46, arranged in the first branch 30, for filtering the lubricant and coolant 36 flowing through the first branch 30. The stator lubricant filter element 46 is also referred to as a first filter element, and the gear lubricant filter element 44 is also referred to as a second filter element. For example, the respective filter element is designed as a respective nonwoven, also referred to as a filter nonwoven. The respective filter element has pores 48 or 50, represented particularly schematically in FIG. 4, through which the lubricant and coolant 36 can flow, so that the lubricant and coolant 36 can flow through the respective filter element. On its way through the respective filter element, the lubricant and coolant 36 is filtered by means of the respective filter element. This is understood to mean in particular that when the lubricant and coolant 36 flows through the respective filter element, any particles contained in the lubricant and coolant 36 are filtered out from the lubricant and coolant 36 by means of the respective filter element, in particular when the particles are larger than the respective pores of the respective filter element.

The filter device 42 and thus the multi-chamber filter have a housing 52, which, for example, has at least or exactly two housing parts 54 and 56. The housing parts 54 and 56 are, for example, housing shells, which are also simply referred to as shells. For example, the housing parts 54 and 56 are designed separately from each other and are at least indirectly, in particular directly, connected to each other. In the mounting position of the electric drive device 10, the housing part 54 is arranged above the housing part 56 in the vehicle vertical direction of the motor vehicle, wherein the electric drive device 10 occupies its mounting position in the completely produced state of the motor vehicle having the electric drive device 10. This mounting position of the drive device 10 is shown in the figures. Thus, the vehicle vertical direction is illustrated by a double arrow 58. Thus, the housing part 54 is also referred to as an upper housing part, upper part or upper shell, so that the housing part 56 is also referred to as a lower housing part, lower part or lower shell. A receiving chamber 62 of the filter device 42 is, in particular directly, delimited by the filter housing 52, in particular by an inner circumferential lateral surface 60 of the filter housing 52. Therefore, the multi-chamber filter has the first filter element which is arranged in the receiving chamber 62 and in the filter housing 52 and which divides the receiving chamber 62 into a first chamber 64 and into a second chamber 66 of the multi-chamber filter and therefore is arranged between the first chamber 64 and the second chamber 66, in particular in the vehicle vertical direction. Furthermore, the multi-chamber filter has the second filter element which is arranged in the receiving chamber 62 and thus in the filter housing 52 and which divides the receiving chamber 62 into the second chamber 66 and into a third chamber 68 and therefore is arranged between the second chamber 66 and the third chamber 68, in particular in the vehicle vertical direction. The multi-chamber filter, in particular the filter housing 52 and more particularly the housing part 54, has a connection 70, also referred to as a connection piece. Therefore, the recirculation 40 has a recirculation line 72 (FIG. 1) which runs, in particular completely, closed from the stator 16 to the connection 70 and which is fluidically connected to the first chamber 64 by means of the connection 70. This means that the recirculation line 72 is connected respectively fluidically both to the connection 70 as well as, in particular via the connection 70, to the first chamber 64. In FIG. 4, an arrow 74 illustrates a first flow of the lubricant and coolant 36, also referred to as a first partial flow, wherein the first partial flow flows through the recirculation line 72 and through the connection 70, and thus flows into the first chamber 64 via the connection 70, in particular bypassing the sump 24. The lubricant and coolant 36 that has flowed into the chamber 64 via the connection 70, i.e., the partial flow, can, as illustrated in FIG. 4 by arrows 76, flow through the first filter element and thus can flow from the chamber 64 into the chamber 66. The second chamber 66 is designed as an intake chamber forming the intake region AB. Furthermore, the filter housing 54 and thus the multi-chamber filter has an insertion opening 78, which in the present case is designed as a through opening, which completely penetrates the filter housing 52, in particular the lower part. Thus, the insertion opening 78 opens into the chamber 68, at one end, in particular directly, and at the other end, in particular directly, into the surroundings 80 of the filter housing 52 per se and in the present case into the sump 24. As illustrated in FIG. 4 by an arrow 82, the lubricant and coolant 36 can flow through the insertion opening 78 out from the sump 24 and therefore can flow, in particular directly, into the chamber 68. As illustrated in FIG. 4 by an arrow 84, the lubricant and coolant 36 that has flowed into the chamber 68 can flow through the second filter element and therefore flow out from the chamber 68 into the chamber 66 and thus into the intake region AB, from or out of which the pump device 28 can suck in the lubricant and coolant 36, i.e., can convey it towards itself, in particular suck it towards itself. It can be seen that the second chamber 66 is arranged between the first chamber 64 and the third chamber 68 in the vehicle vertical direction, wherein, in the mounting position of the electric drive device 10, the first chamber 64 is arranged in the vehicle vertical direction (double arrow 58) above the second chamber 66, which, in the mounting position of the electric drive device 10, is arranged above the third chamber 68 in the vehicle vertical direction. The first chamber 64 has the ventilation point S for ventilating the first branch 30. The ventilation point S has, in particular exactly, one vent opening 86 which penetrates through the filter housing 52, in particular the housing part 54, in particular completely. Thus, the vent opening 86 opens into the chamber 64 at one end, in particular directly, and at the other end, in particular directly, into the surroundings 80 and therefore into the sump 24.

It can be seen from FIG. 4 that the connection 70 protrudes slightly and in this case, for example, between 5 and 10 mm into the chamber 64. Furthermore, it can be seen from FIG. 4 that the stator lubricant filter element 46 is less finely structured in comparison to the gear lubricant filter element 44, so that the pores 50 of the first filter element are larger than the pores of the second filter element. Alternatively or additionally, for example, the stator lubricant filter element 46 has a smaller layer thickness, running in particular in the vehicle vertical direction, in comparison to the gear lubricant filter element 44.

Figure 2:
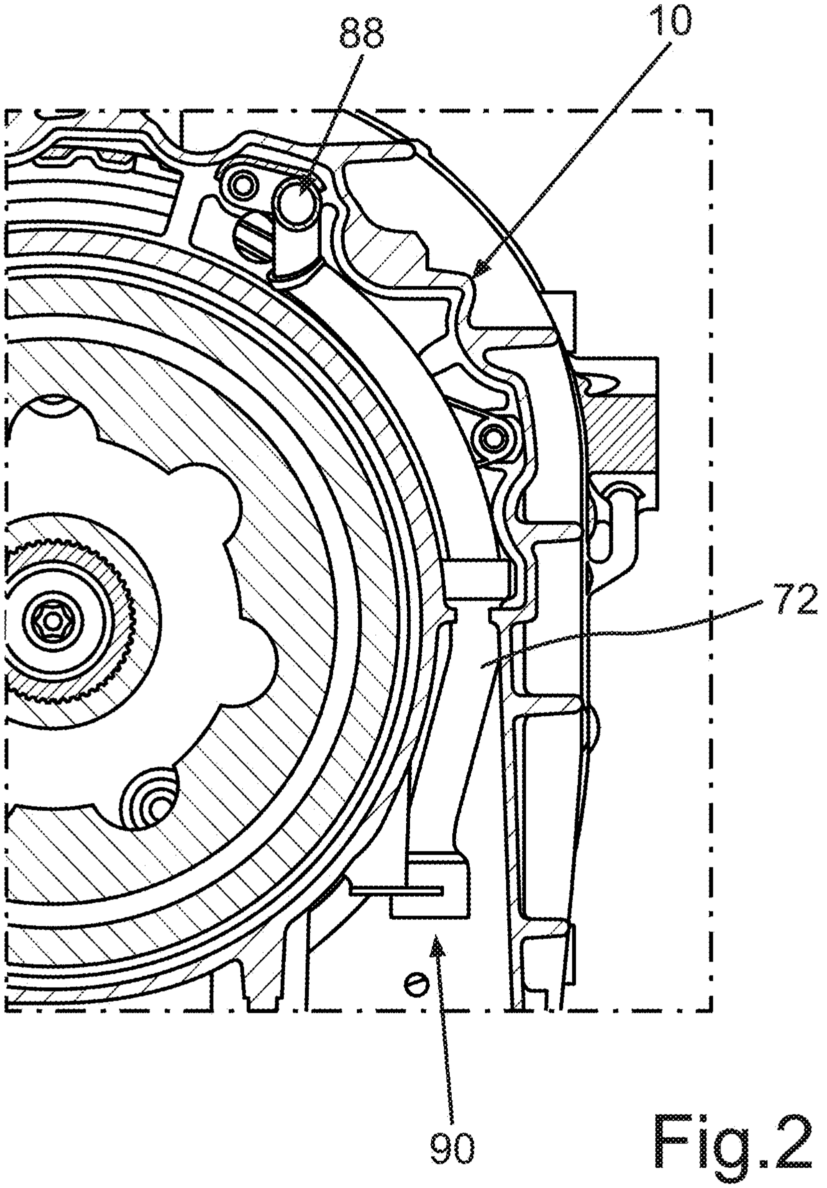
FIG. 2, in part, is a schematic side view of the drive device.

It can be seen particularly well from FIG. 3 that the insertion opening 78 is arranged in the mounting position of the electric drive device 10 in the vehicle vertical direction (double arrow 58) and thus geodetically below the level 38 of the lubricant and coolant 36. The ventilation point S and thus the vent opening 86 formed as a through opening are also arranged below the level 38 of the lubricant and coolant 36 in the mounting position of the electric drive device 10 in the vehicle vertical direction. It can be seen from FIG. 2 that the recirculation line 72 has an inlet opening 88 through which the lubricant and coolant 36 can flow, in particular flowing away from the stator 16, which inlet opening is at least indirectly fluidically connected to a stator outlet opening, not shown in the figures, through which the lubricant and coolant 36 flowing away in particular from the stator 16 can flow. Furthermore, the recirculation line 72 has an outlet opening 90, through which the lubricant and coolant 36 flowing through the recirculation line 72 can flow and via which, for example, the recirculation line 72 is fluidically connected to the connection 70, so that the recirculation line 72 is fluidically connected to the first chamber 64 via its outlet opening 90 and via the connection 70. It can be seen from FIG. 3 that preferably the outlet opening 90 of the recirculation line 72 is arranged in the mounting position of the electric drive device 10 in the vehicle vertical direction and thus geodetically below the level 38 of the lubricant and coolant 36. Thus, the lubricant and coolant 36 can be recirculated from the stator 16 to below the level 38 of the lubricant and coolant 36 and to below its surface in the sump 24, also referred to as a tank, by means of the recirculation 40. The recirculation line 72, preferably completely closed at least from the stator 16 to the connection 70 and also referred to as a return line, can receive and channel the lubricant and coolant 36 after it has absorbed heat from the stator 16 and guide it back to and into the sump 24. Therefore, excessive foaming of the lubricant and coolant 36 can be avoided, in particular in that the lubricant and coolant 36 does not come into contact with air on its way from the stator 16 to and into the sump 24. In particular, this can be realized in that the recirculation line 72 is closed, in particular completely, from the stator 16 up to the connection 70. Furthermore, this means that an exact amount of the lubricant and coolant 36 can be known in the circuit, so that no amount of the lubricant and coolant 36 has be kept due to unknown recirculation times. Heat absorbed by the lubricant and coolant 36 and provided, for example, by the stator 16 can, for example, be guided directly again into the sump 24 and can, for example, be available for example to the cooling device 26 in the case of renewed suction. The cooling device 26 is designed, for example, as a heat exchanger, via which the heat contained in the lubricant and coolant 36 can be transmitted, for example, to a further medium, designed in particular as a fluid. This means that the medium can be heated. For example, the interior of the motor vehicle and/or another, further component can be heated by means of the heated medium. For example, the recirculation line 72, designed as a tube or recirculation tube, is formed from plastic and thus can be produced cost-effectively.

Typically, in particularly powerful, electric drive devices having a respective, fluid-cooled, in particular oil-cooled, electric engine, large volume flows of the lubricant and coolant 36 are required, in order to ensure sufficient cooling and/or lubricating in particular of the electric engine. A high delivery rate of the lubricant and coolant, resulting therefrom, in particular in connection with the desire to keep an amount, also referred to as a fill amount, of the lubricant and coolant 36 in the drive device 10 low, can lead to a high circulation index, in particular in the sump 24, and to a high gas content in the lubricant and coolant 36. It is particularly desirable for this reason that the amount of lubricant and coolant 36 in the drive device 10 is kept low, in order to keep the installation space requirement, the costs and the weight as low as possible. In order to avoid an excessively high gas content in the lubricant and coolant 36, i.e., an excessively high level of foaming of the lubricant and coolant 36, the recirculation 40, which is closed with the exception of the ventilation point S, is provided in the drive device 10. In particular, the first partial flow from the stator 16 can be directly recirculated into the chamber 64 by means of the recirculation 40, bypassing the open sump 24, and thus directly into the filter device 42. For example, the filter device 42 is designed as a filter module, in particular as an oil filter module. In comparison to conventional solutions, the filter device 42 has several chambers, this means in the present case at least or exactly three chambers, specifically the first chamber 64, the second chamber 66 and the third chamber 68. Due to the at least substantially closed recirculation 40, at least the first partial flow can be directly, i.e., bypassing the sump 24, guided to the filter device 42, designed for example as a multi-chamber filter module, whereby an excessive circulation index of the amount of the lubricant and coolant 36 passing the sump 24 can be avoided. Retention time of the lubricant and coolant 36 in the sump 24 increases in comparison to conventional solutions, so that the lubricant and coolant 36 received in the sump 24 can be advantageously degassed. Thus, an excessive gas content in the lubricant and coolant 36 of the electric drive device 10 can be avoided, which has a positive effect on cooling and/or lubricating characteristics of the lubricant and coolant 36. In comparison to conventional solutions, for example, a volume flow of the lubricant and coolant 36 to be conveyed by means of the pump device 28 can be reduced for an identical cooling and/or lubricating effect, which has a positive effect on a power consumption of the pump device 28, preferably designed as an oil pump. This means a particularly energy-efficient operation can be ensured. For example, the amount of the lubricant and coolant 36 received in the drive device 10 can also be reduced in comparison to conventional solutions, whereby the costs and the weight of the drive device 10 can be kept within particularly low limits.

LIST OF REFERENCE CHARACTERS

10 electric drive device
12 electric engine
14 rotor
16 stator
18 gear components
20 cooling and lubricating device
22 lubricant and coolant circuit
24 sump
26 cooling device
28 pump device
30 first branch
32 second branch
34 arrow
36 lubricant and coolant
38 level
40 recirculation
42 filter device
44 gear lubricant filter element
46 stator lubricant filter element
48 pores
50 pores
52 filter housing
54 housing part
56 housing part
58 double arrow
60 inner circumferential lateral surface
62 receiving chamber
64 first chamber
66 second chamber
68 third chamber
70 connection
72 recirculation line
74 arrow
76 arrow
78 insertion opening
80 surroundings
82 arrow
84 arrow
86 vent opening
88 inlet opening
90 outlet opening
AB intake region
S ventilation point

The invention claimed is:

1. An electric drive device (10) for a motor vehicle, comprising:

an electric engine (12) which has a rotor (14) and a stator (16);

gear components (18) via which the motor vehicle is drivable by the electric engine (12);

a cooling and lubricating device (20) which has a lubricant and coolant circuit (22) through which lubricant and coolant (36) is flowable and in which the gear components (18), the electric engine (12), a sump (24) for receiving the lubricant and coolant (36), a cooling device (26) for cooling the lubricant and coolant (36), and a pump device (28) are disposed, wherein via the pump device (28) the lubricant and coolant (36) is conveyable from the sump (24) at least to the gear components (18);

wherein the lubricant and coolant circuit (22) has a first branch (30) through which lubricant and coolant (36) conveyed by the pump device (28) is flowable from the sump (24) and via which lubricant and coolant (36) flowing through the first branch (30) is supplyable to the stator (16);

wherein the lubricant and coolant circuit (22) has a second branch (32) through which lubricant and coolant (36) conveyed by the pump device (28) is flowable from the sump (24) and via which lubricant and coolant (36) flowing through the second branch (32) is supplyable to the gear components (18);

wherein the first branch (30) is configured, except for a ventilation point(S), as a closed circuit which has a recirculation (40) running closed, except for the ventilation point (S), from the stator (16) to an intake region (AB), wherein via the recirculation (40) the lubricant and coolant (36) is guidable into the intake region (AB), and wherein from the intake region (AB) the lubricant and coolant (36) is pumpable by the pump device (28); and a filter device (42), wherein the filter device (42) is disposed in the sump (24), is configured as a multi-chamber filter, has a gear lubricant filter element (44) for filtering lubricant and coolant (36) flowing through the second branch (32), and has a stator lubricant filter element (46) disposed in the first branch (30) for filtering lubricant and coolant (36) flowing through the first branch (30).

2. The electric drive device (10) according to claim 1:

wherein the multi-chamber filter has a filter housing (52) which delimits a receiving chamber (62) for at least temporarily receiving the lubricant and coolant (36);

wherein the stator lubricant filter element (46) is disposed in the filter housing (52), wherein the stator lubricant filter element (46) divides the receiving chamber (62) into a first chamber (64) of the multi-chamber filter and into a second chamber (66) of the multi-chamber filter and is disposed between the first chamber (64) and the second chamber (66), and wherein the second chamber (66) is an intake chamber forming the intake region (AB);

wherein the gear lubricant filter element (44) is disposed in the filter housing (52) and wherein the gear lubricant filter element (44) divides the receiving chamber (62) into the second chamber (66) and a third chamber (68) of the multi-chamber filter and is disposed between the second chamber (66) and the third chamber (68);

wherein the recirculation (40) has a recirculation line (72) which runs closed from the stator (16) to a connection (70) and which is fluidically connected to the first chamber (64) by the connection (70);

wherein via an insertion opening (78) of the third chamber (68), the lubricant and coolant (36) is introducible into the third chamber (68) from the sump (24).

3. The electric drive device (10) according claim 2, wherein the second chamber (66) is disposed between the first chamber (64) and the third chamber (68).

4. The electric drive device (10) according to claim 2, wherein, in a mounting position of the electric drive device (10) in the motor vehicle, the first chamber (64) is disposed above the second chamber (66) in a vertical direction (58) of the motor vehicle and wherein the second chamber (66), in the mounting position of the electric drive device (10) in the motor vehicle, is disposed above the third chamber (68) in the vertical direction (58) of the motor vehicle.

5. The electric drive device (10) according to claim 2, wherein the first chamber (64) has the ventilation point(S).

6. The electric drive device (10) according to claim 2, wherein the ventilation point(S) has a vent opening (86) of the filter housing (52).

7. The electric drive device (10) according to claim 2, wherein the connection (70) overlaps the first chamber (64).

8. The electric drive device (10) according to claim 1, wherein the stator lubricant filter element (46) is less finely structured in comparison to the gear lubricant filter element (44) and/or has a smaller layer thickness in comparison to the gear lubricant filter element (44).

* * * * *